United States Patent

Bohlen

[11] Patent Number: 6,116,658
[45] Date of Patent: Sep. 12, 2000

[54] COUNTER TORQUE TUBE CONNECTION

[75] Inventor: Daniel L. Bohlen, Evendale, Ohio

[73] Assignee: General Electric Company, Cincinnati, Ohio

[21] Appl. No.: 08/968,096

[22] Filed: Nov. 12, 1997

[51] Int. Cl.[7] .................................................. F16L 35/00
[52] U.S. Cl. ....................... 285/330; 285/330; 285/334.4; 285/913; 285/354
[58] Field of Search ........................... 285/330, 92, 334.4, 285/913, 354

[56] References Cited

U.S. PATENT DOCUMENTS

| 96,545 | 11/1869 | Brady | 285/330 |
|---|---|---|---|
| 398,620 | 2/1889 | Jobes | 285/330 |
| 520,514 | 5/1894 | Bryant | 285/330 |
| 600,988 | 3/1898 | Hayes | 285/330 |
| 821,564 | 5/1906 | Wilks | 285/330 |
| 1,455,971 | 5/1923 | Rickenbacker | 285/330 |
| 1,504,363 | 8/1924 | Madigan | 285/330 |
| 1,589,781 | 6/1926 | Anderson | 285/330 |
| 2,109,344 | 2/1938 | Selger | 285/330 |
| 5,127,679 | 7/1992 | Pouplier | 285/92 |
| 5,188,398 | 2/1993 | Parimore, Jr. et al. | 285/39 |
| 5,263,312 | 11/1993 | Walker et al. | 60/39.31 |
| 5,321,205 | 6/1994 | Bawa et al. | 285/330 |
| 5,340,163 | 8/1994 | Merrer et al. | 285/93 |
| 5,431,507 | 7/1995 | Smilanick | 285/913 |

FOREIGN PATENT DOCUMENTS

| 1122469 | 1/1962 | Germany | 285/330 |
|---|---|---|---|
| 90041 | 1/1959 | Netherlands | 285/330 |
| 278322 | 8/1970 | U.S.S.R. | 285/334.4 |
| 2114694 | 8/1983 | United Kingdom | 285/330 |
| 92/15816 | 2/1991 | WIPO . | |

*Primary Examiner*—Eric K. Nicholson
*Attorney, Agent, or Firm*—Andrew C. Hess; Nathan D. Herkamp

[57] ABSTRACT

A counter torque tube connection which couples a first tube and a second tube in turbine engine. The connection first tube includes a male connector component having a ballnose. The ballnose includes a plurality of protrusions. The connection second tube includes a female connector component having a ferrule end fitting sized to receive the ballnose. The female connection component includes a plurality of protrusions that interfit with the ballnose protrusions. The tubes are coupled by extended a nut over the female component and coupling the nut to the male component. The interfitting protrusions prevent torsional loads applied to the tubes from being transmitted to the nut so that the nut remains secured.

12 Claims, 2 Drawing Sheets

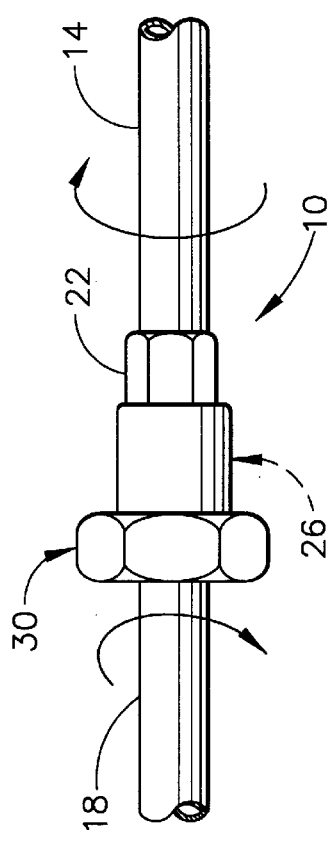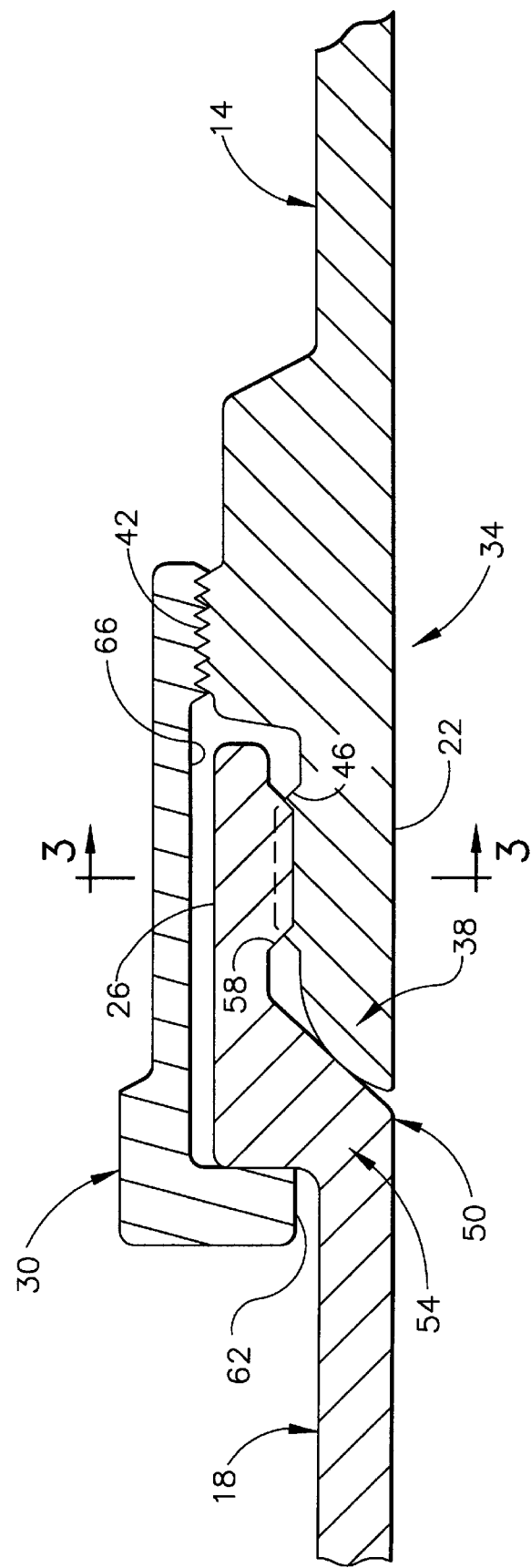

COUNTER TORQUE TUBE CONNECTION

FIELD OF THE INVENTION

This invention relates generally to turbine engines and, more particularly, to an apparatus for preventing torsional loads from loosening tubing connections.

BACKGROUND OF THE INVENTION

Turbomachinery frequently employs a wide variety of tubing to route different types of fluids throughout the machinery. The tubing commonly comprises male and female body components joined by a nut coupled to one of the components cooperating with threads on the other component. This coupling permits connection and disconnection by relative rotation about the tubing centerline. The conditions to which the connected coupling is subjected can sometimes, over a period of time, cause loosening of the nut and resultant leakage. For example, a typical tubing connection of a gas turbine engine is subjected to various vibratory and torsional loads, as well as significant thermal growth.

Many different types of lock devices have been previously proposed and implemented to prevent the loosening of such couplings. However, these devices have generally suffered from one or more disadvantages or defects. For example, certain lock designs require installation prior to coupling makeup, and retrofitting is not possible without system disassembly. With certain other designs, it has been necessary to locate the coupling components in a particular aligned relationship before the devices will function properly.

It would be desirable, to provide an apparatus which facilitates coupling of the male and female components while eliminating the loosening loads on the nut due to the loads placed on the coupling. It would also be desirable to provide such an apparatus which is allows the tubing to be coupled without system disassembly.

SUMMARY OF THE INVENTION

These and other objects may be attained by a counter torque tube connection which, in one embodiment, couples a first tube to a second tube, in a turbine engine. The connection includes a first tube having a male connector component at one end. The male connector component includes a ballnose having a plurality of outward extending radial protrusions. The connection also includes a second tube having a female connector component at one end. The female component includes a ferrule end fitting having a plurality of inward extending radial protrusions sized to receive and interfit with the male component protrusions. The connection further includes a nut that secures the first and second tubes.

The first and second tubes are coupled by extending the male connector component protrusions into the ferrule end fitting protrusions. The nut is then extended over the female connector component and secured to the male connector component. After securing the first and second tubes using the connection, torsional loads are prevented from being applied to the nut by the first and second protrusions.

The above-described counter torque tube connection couples a first tube to a second tube, in a gas turbine engine. In addition, the connection prevents torsional loads from being transmitted to the nut so that the nut remains secured. Additionally, the connection allows the tubes to be coupled without disassembly of the engine.

BRIEF DESCRIPTION OF THE DRAWINGS

FIG. 1 is a side view of a counter torque tube connection.

FIG. 2 is a cross sectional view of counter torque tube connection of FIG. 1 accordance with one embodiment of the present invention.

DETAILED DESCRIPTION

Figure 3:
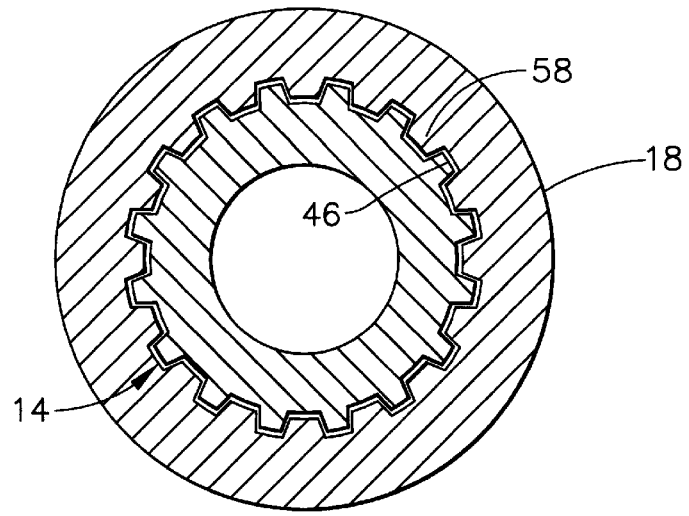
FIG. 3 is a partial cross-sectional cut-away view of counter torque tube connection of FIG. 1.

FIG. 1 is a side view of a counter torque tube connection 10 including a first tube 14 and a second tube 18. First tube 14 includes a first end (not shown), a second end 22, and a flow passage (not shown). Second tube 18 includes a first end 26, a second end (not shown), and a flow passage (not shown). Connection 10 also includes a substantially cylindrical shaped nut 30 sized to extend over second tube first end 26 and to receive first tube second end 22 so that first and second tubes 14 and 18 are coupled.

As shown in FIG. 2, first tube first end 22 includes a substantially cylindrical shaped male connector component 34 having a ballnose 38 and a threaded outer diameter 42. Ballnose 38 includes a plurality of axial protrusions 46 extending radially outward. Second tube first end 26 includes a substantially cylindrical shaped female connector component 50 having a ferrule end fitting 54 sized to receive ballnose 38. Ferrule end fitting 54 includes a plurality of axial protrusions 58 extending radially inward. Protrusions 46 are sized and spaced to interfit with protrusions 58. Substantially cylindrical shaped nut 30 includes a tube bore 62 sized to receive second tube 18 and a coupling bore 66 sized to receive male connector component 34. Coupling bore 66 is threaded and sized to threadedly engage male connector component threads 42. As shown in FIG. 3, protrusions 46 and 58 are involute splines for limiting torque load transmitted through first and second tubes 14 and 18. The components of connection 10 may, for example, be fabricated from A286 stainless steel. The specific material selected depends, of course, on the specific temperature requirements and design parameters of a specific application, and materials other than A286 stainless steel can be used, e.g., Inconel.

To secure first tube 14 to second tube 18 using connection 10, ballnose 38 is extended into ferrule end fitting 54 and nut 30 couples first and second tubes 14 and 18. Particularly, ballnose spline shaped protrusions 46 are aligned with ferrule protrusions 58 and ballnose 38 is extended into ferrule 54. Nut 30 is then extended over male component 34 and threadedly engaged to outer diameter threads 42. First and second tubes 14 and 18 are coupled by securing nut 30. Securing nut 30 plastically deforms ferrule end fitting 54 and balinose 38 so that fluid leakage is prevented. In operation, spline protrusions prevent torsional loads applied first or second tubes 14 and 18 from being transmitted to nut 30 so that the nut 30 remains secure.

Figure 4:
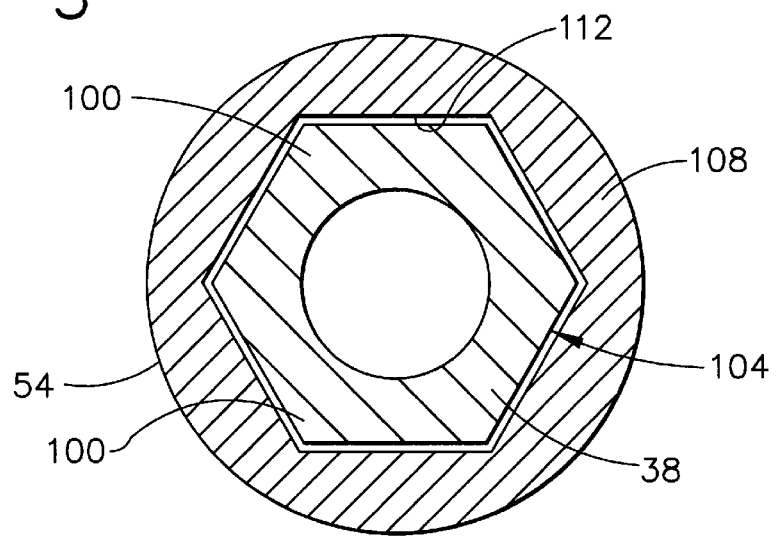
FIG. 4 is a cross sectional view of the counter torque tube connection in accordance, with an alternative embodiment.
Figure 5:
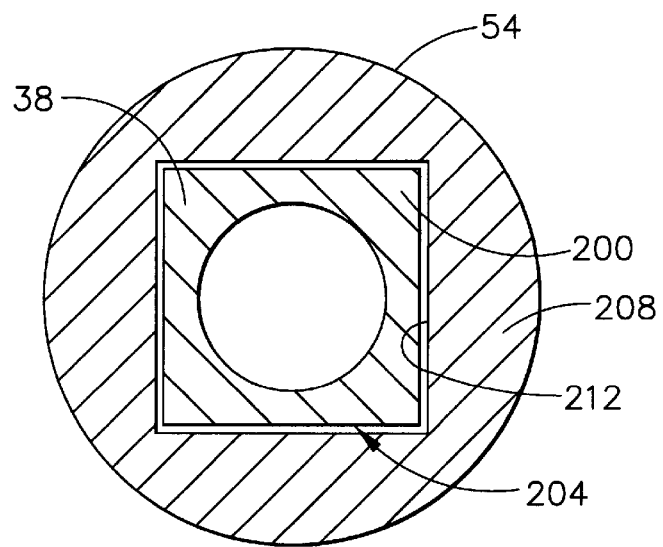
FIG. 5 is a cross sectional view of the counter torque tube connection in accordance with another alternative embodiment.

In an alternative embodiment of the present invention shown in FIG. 4, ballnose protrusions 100 form a hexagonal shape 104 and ferrule end fitting protrusions 108 form a hexagonal opening 112. Hexagonal opening 112 is sized to receive hexagonal shape 104 when ballnose 38 is extended into ferrule end fitting 54. In another embodiment of the invention shown in FIG. 5, ballnose protrusions 200 form a square shape 204 and ferrule end fitting protrusions 208 form a square opening 212. Opening 212 is sized to receive shape 204 when ballnose 38 is extended into ferrule end fitting 54.

The above-described counter torque tube connection allows a first tube to be couple tube while preventing loads from loosening the connection and causing leakage. In addition, the connection allows the tubes to be connected without disassembly of the tubes.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A counter torque tube connection for use in a turbine engine, said connection comprising:
    a first tube comprising a flow passage, a first end, and a second end, said first end having a ballnose connection, said ballnose connection having an outer diameter wherein at least a portion of said outer diameter is threaded, and at least one axial protrusion extending radially outward;
    a second tube comprising a flow passage, a first end, and a second end, said first end having a ferrule end fitting, said ferrule end fitting comprising an inner surface and a smooth outer surface and configured to receive said ballnose connection, said ballnose connection and said ferrule end fitting further comprising a plurality of interfitting protrusions; and
    a nut coupled to said second tube configured to secure said first tube to said second tube.

2. A counter torque tube connection in accordance with claim 1 wherein said nut is threaded and wherein said nut threadedly engages said ballnose connection threads.

3. A counter torque tube connection in accordance with claim 1 wherein said ferrule end fitting has at least one axial protrusion extending radially inward from said inner surface.

4. A counter torque tube connection in accordance with claim 3 wherein said ballnose and ferrule end fitting protrusions are involute splines.

5. A counter torque tube connection in accordance with claim 3 wherein said ballnose protrusions extend away from said first tube and form a hexagonal shape and said ferrule end fitting protrusions form a hexagonal opening for receiving said ballnose protrusion hexagonal shape.

6. A counter torque tube connection in accordance with claim 3 wherein said ballnose protrusions extend away from said first tube and form a square shape and said ferrule end fitting protrusions form a square opening for receiving said ballnose protrusion square shape.

7. A counter torque connector apparatus for coupling a first tube to a second tube, said apparatus comprising:
    a male connector component comprising a flow passage, a first end, and a second end, said first end having a ballnose connection, said ballnose connection having an outer diameter wherein at least a portion of said outer diameter is threaded, and at least one axial protrusion extending radially outward, said second end coupled to the first tube;
    a female connector component comprising a flow passage, a first end, and a second end, said first end having a ferrule end fitting, said ferrule end fitting comprising an inner surface and a smooth outer surface and configured to receive said ballnose connection, said ballnose connection and said ferrule end fitting further comprising a plurality of interfittinq protrusions, said second end coupled to the second tube; and
    a nut coupled to said male connector configured to secure said male connector to said female connector.

8. A counter torque connector apparatus in accordance with claim 7 wherein said nut is threaded and wherein said nut threadedly engages said ballnose connection threads.

9. A counter torque connector apparatus in accordance with claim 7 wherein said ferrule end fitting has at least one axial protrusion extending radially inward from said inner surface.

10. A counter torque connector apparatus in accordance with claim 9 wherein said ballnose and ferrule end fitting protrusions are involute splines.

11. A counter torque connector apparatus in accordance with claim 9 wherein said ballnose protrusions extend away from said male connector component and form a hexagonal shape and said ferrule end fitting protrusions form a hexagonal opening for receiving said ballnose protrusion hexagonal shape.

12. A counter torque connector apparatus in accordance with claim 9 wherein said ballnose protrusions extend away from said male connector component and form a square shape and said ferrule end fitting protrusions form a square opening for receiving said ballnose protrusion square shape.

* * * * *